(12) United States Patent
Hsu et al.

(10) Patent No.: US 9,733,389 B2
(45) Date of Patent: Aug. 15, 2017

(54) MULTI-SENSOR CONTAMINATION MONITORING

(71) Applicant: Schlumberger Technology Corporation, Sugar Land, TX (US)

(72) Inventors: Kai Hsu, Sugar Land, TX (US); Julian J. Pop, Houston, TX (US); Kentaro Indo, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 813 days.

(21) Appl. No.: 13/721,981

(22) Filed: Dec. 20, 2012

(65) Prior Publication Data

US 2014/0180591 A1 Jun. 26, 2014

(51) Int. Cl.
*G01V 11/00* (2006.01)
*E21B 49/10* (2006.01)
*G01V 8/00* (2006.01)

(52) U.S. Cl.
CPC .............. *G01V 11/00* (2013.01); *E21B 49/10* (2013.01); *G01V 8/00* (2013.01)

(58) Field of Classification Search
CPC ............ G01V 11/00; G01V 8/00; E21B 49/10
USPC .......................................................... 702/8
See application file for complete search history.

(56) References Cited

U.S. PATENT DOCUMENTS

| | | |
|---|---|---|
| 6,274,865 B1 | 8/2001 | Schroer et al. |
| 6,343,507 B1* | 2/2002 | Felling et al. ............. 73/152.19 |
| 6,350,986 B1 | 2/2002 | Mullins et al. |
| 7,081,615 B2 | 7/2006 | Betancourt et al. |
| 7,178,591 B2 | 2/2007 | Del Campo et al. |
| 7,445,934 B2 | 11/2008 | DiFoggio et al. |
| 7,484,563 B2 | 2/2009 | Zazovsky et al. |
| 7,644,610 B2 | 1/2010 | Meister |
| 7,711,488 B2 | 5/2010 | Hsu et al. |
| 7,958,772 B2 | 6/2011 | Permuy et al. |
| 8,024,125 B2 | 9/2011 | Hsu et al. |
| 9,334,929 B2 | 5/2016 | Hart et al. |
| 2004/0000433 A1* | 1/2004 | Hill et al. ........................ 175/59 |
| 2005/0182566 A1* | 8/2005 | DiFoggio ......................... 702/11 |
| 2007/0198192 A1* | 8/2007 | Hsu .......................... E21B 47/12 702/6 |
| 2008/0156088 A1* | 7/2008 | Hsu .......................... E21B 49/10 73/152.23 |

(Continued)

OTHER PUBLICATIONS

Hsu Kai, Multichannel oil-base mud contamination monitoring using downhole optical spectrometer., SPWLA 49$^{th}$ Annual Logging Symposium, May 25-28, 2008.*

(Continued)

*Primary Examiner* — Gregory J Toatley
*Assistant Examiner* — Yoshihisa Ishizuka

(57) ABSTRACT

A downhole sampling tool is operated to obtain formation fluid from a subterranean formation, which then flows through a flowline of the downhole sampling tool. Real-time density and optical density sensors of the downhole sampling tool are co-located proximate the flowline. Contamination of the formation fluid in the flowline is then determined based, at least in part, on the real-time density and optical density measurements obtained utilizing the co-located sensors.

20 Claims, 7 Drawing Sheets

(56) References Cited

U.S. PATENT DOCUMENTS

2011/0042070 A1* 2/2011 Hsu ..................... E21B 47/102
  166/250.01
2011/0042071 A1* 2/2011 Hsu et al. ................ 166/250.01

OTHER PUBLICATIONS

S. Eyuboglu, M. Proett, L. Gao, W. Sliman, R. Senne, B. Pedigo, B. Engelman, Halliburton, "A New Numerical and Analytical Approach for Determining Formation Fluid-Sample Cleanup Behavior Through Multiple Sensor Analysis," SPE 152197, Society of Petroleum Engineers, 2012, pp. 1-7. Paper was presented at the SPE Latin America and Caribbean Petroleum Engineering Conference held in Mexico City, Mexico, Apr. 16-18, 2012.

Mullins et al., Realtime Quantification of OBM Filtrate Contamination in the MDT Using OFA Data, SPWLA 41st Annual Logging Symposium, Jun. 4-7, 2000 Paper SS. 10 Pages.

Mullins et al., Real-time Determination of Filtrate Contamination during Openhole Wireline Sampling by Optical Spectroscopy, SPE Annual Technical Conference and Exhibition Dallas, Texas, Oct. 1-4, 2000 SPE 63071. 13 pages.

Mullins et al., Linearity of Near-infrared Spectra of Alkanes, Applied Spectroscopy, 2000. p. 624-629. vol. 54, No. 4.

Hammond et al., One- and Two-phase Flow during Fluid sampling by a Wireline Tool. Transport in Porous Media, vol. 6, p. 299-330. 1991. Kluwer Academic Publishers. The Netherlands.

Hsu et al., Multichannel Oil-Base Mud Contamination monitoring Using Downhole Optical Spectrometer, SPWLA 49th Annual Logging Symposium, Edinburgh, Scotland. May 25-28, 2008. 13 pages.

Fujisawa et al., Reservoir Fluid Characterization with a New-Generation Downhole Fluid Analysis Tool, SPWLA 49th Annual Logging Symposium, Edinburgh, Scotland. May 25-28, 2008. 7 pages.

Gozalpour et al., Predicting Reservoir Fluid Phase and Volumetric Behavior from Samples Contaminated with Oil-Based Mud, SPE Annual Technical Conference and Exhibition, Houston, Texas. Oct. 3-6, 2008. SPE 56747.

* cited by examiner

MULTI-SENSOR CONTAMINATION MONITORING

BACKGROUND OF THE DISCLOSURE

Downhole fluid analysis (DFA) is often used to provide information in real time about the properties of subterranean formations and/or the compositions of reservoir fluids. Such real-time information can be used to improve or optimize the effectiveness of formation testing tools during a sampling processes in a given well, including sampling processes which don't return a captured formation fluid sample to the Earth's surface. For example, DFA allows for reducing and/or optimizing the number of samples captured and brought back to the surface for further analysis. Some known downhole fluid analysis tools such as the LIVE FLUID ANALYZER (LFA), the COMPOSITION FLUID ANALYZER (CFA) and the INSITU FLUID ANALYZER (IFA), which are commercially available from SCHLUMBERGER TECHNOLOGY CORPORATION and/or its affiliate(s), can measure absorption spectra of formation fluids under downhole conditions. Each of these known fluid analyzers provides multiple channels, each of which corresponds to a different wavelength of light that corresponds to a measured spectrum ranging from visible to near infrared wavelengths. The output of each channel represents an optical density (i.e., the logarithm of the ratio of incident light intensity to transmitted light intensity), where an optical density (OD) of zero (0) corresponds to 100% light transmission, and an OD of one (1) corresponds to 10% light transmission. The combined OD output of the channels provides spectral information that can be used to determine or estimate the composition, contamination and/or various other parameters of formation fluids.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
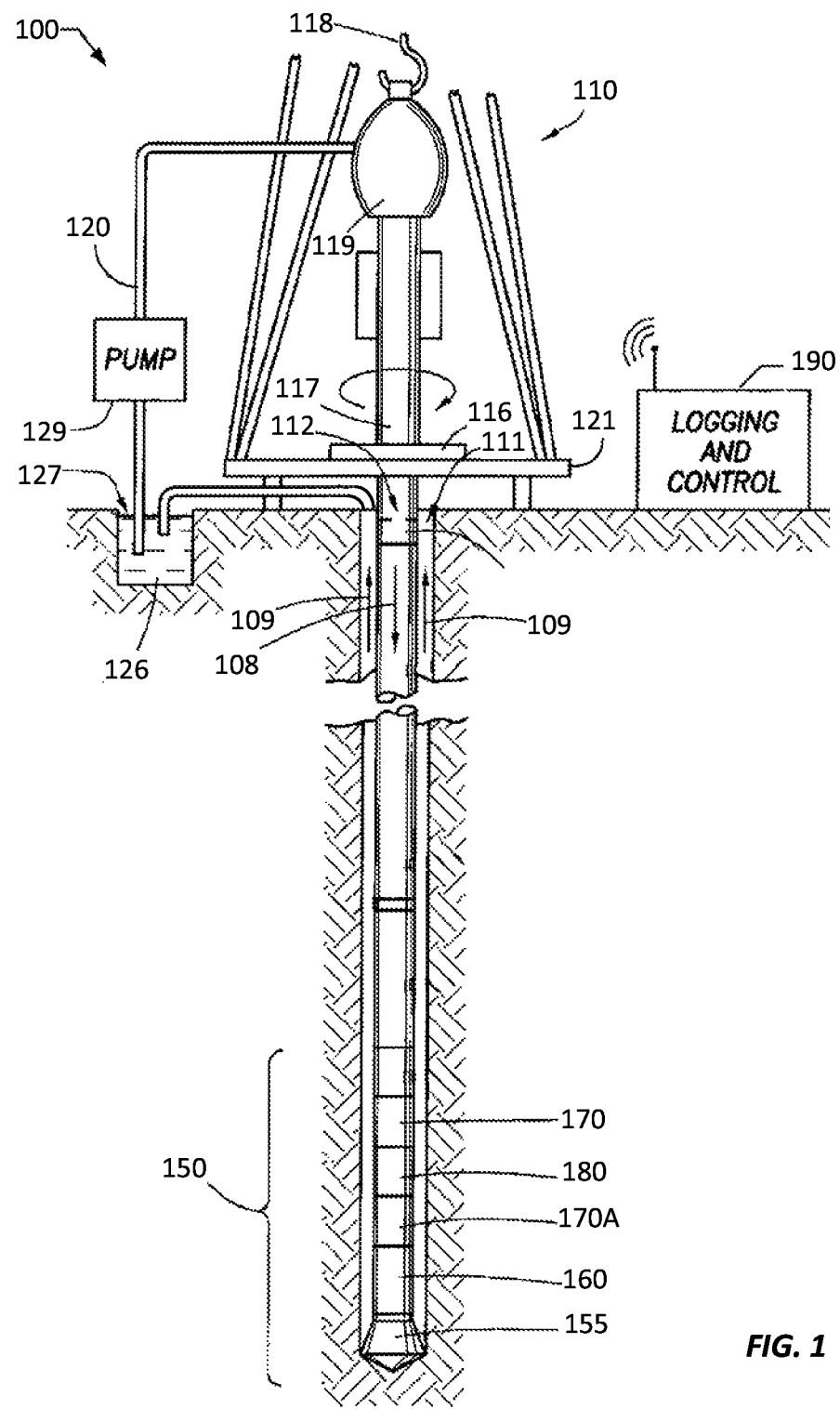
FIG. 1 is a schematic view of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed except where specifically noted as indicating a relationship. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

FIG. 1 is a schematic view of an example wellsite system 100 in which one or more aspects disclosed herein may be employed. The wellsite 100 may be onshore or offshore. In the example system shown in FIG. 1, a borehole 111 is formed in subterranean formations by rotary drilling. However, other example systems within the scope of the present disclosure may alternatively or additionally use directional drilling.

As shown in FIG. 1, a drillstring 112 suspended within the borehole 111 comprises a bottom hole assembly (BHA) 150 that includes a drill bit 155 at its lower end. The surface system includes a platform and derrick assembly 110 positioned over the borehole 111. The assembly 110 may comprise a rotary table 116, a kelly 117, a hook 118 and a rotary swivel 119. The drill string 112 may be suspended from a lifting gear (not shown) via the hook 118, with the lifting gear being coupled to a mast (not shown) rising above the surface. An example lifting gear includes a crown block whose axis is affixed to the top of the mast, a vertically traveling block to which the hook 118 is attached, and a cable passing through the crown block and the vertically traveling block. In such an example, one end of the cable is affixed to an anchor point, whereas the other end is affixed to a winch to raise and lower the hook 118 and the drillstring 112 coupled thereto. The drillstring 112 comprises one or more types of drill pipes threadedly attached one to another, perhaps including wired drilled pipe.

The drillstring 112 may be raised and lowered by turning the lifting gear with the winch, which may sometimes entail temporarily unhooking the drillstring 112 from the lifting gear. In such scenarios, the drillstring 112 may be supported by blocking it with wedges in a conical recess of the rotary table 116, which is mounted on a platform 121 through which the drillstring 112 passes.

The drillstring 112 may be rotated by the rotary table 116, which engages the kelly 117 at the upper end of the drillstring 112. The drillstring 112 is suspended from the hook 118, attached to a traveling block (not shown), through the kelly 117 and the rotary swivel 119, which permits rotation of the drillstring 112 relative to the hook 118. Other example wellsite systems within the scope of the present disclosure may utilize a top drive system to suspend and rotate the drillstring 112, whether in addition to or as an alternative to the illustrated rotary table system.

The surface system may further include drilling fluid or mud 126 stored in a pit 127 formed at the wellsite. A pump 129 delivers the drilling fluid 126 to the interior of the drillstring 112 via a hose 120 coupled to a port in the swivel 119, causing the drilling fluid to flow downward through the drillstring 112 as indicated by the directional arrow 108. The drilling fluid exits the drillstring 112 via ports in the drill bit 155, and then circulates upward through the annulus region between the outside of the drillstring 112 and the wall of the borehole 111, as indicated by the directional arrows 109. In this manner, the drilling fluid 126 lubricates the drill bit 155 and carries formation cuttings up to the surface as it is returned to the pit 127 for recirculation.

The BHA 150 may comprise one or more specially made drill collars near the drill bit 155. Each such drill collar may comprise one or more logging devices, thereby allowing downhole drilling conditions and/or various characteristic properties of the geological formation (e.g., such as layers of rock or other material) intersected by the borehole 111 to be measured as the borehole 111 is deepened. For example, the BHA 150 may comprise a logging-while-drilling (LWD) module 170, a measurement-while-drilling (MWD) module 180, a rotary-steerable system and motor 160, and the drill bit 155. Of course, other BHA components, modules and/or tools are also within the scope of the present disclosure.

The LWD module 170 may be housed in a drill collar and may comprise one or more logging tools. It will also be understood that more than one LWD and/or MWD module may be employed, e.g., as represented at 170A. References herein to a module at the position of 170 may mean a module at the position of 170A as well. The LWD module 170 may comprise capabilities for measuring, processing and storing information, as well as for communicating with the surface equipment.

The MWD module 180 may also be housed in a drill collar and may comprise one or more devices for measuring characteristics of the drillstring 112 and/or drill bit 155. The MWD module 180 may further comprise an apparatus (not shown) for generating electrical power to be utilized by the downhole system. This may include a mud turbine generator powered by the flow of the drilling fluid 126, it being understood that other power and/or battery systems may also or alternatively be employed. In the example shown in FIG. 1, the MWD module 180 comprises one or more of the following types of measuring devices: a weight-on-bit measuring device, a torque measuring device, a vibration measuring device, a shock measuring device, a stick slip measuring device, a direction measuring device, and an inclination measuring device, among others within the scope of the present disclosure. The wellsite system 100 also comprises a logging and control unit 190 communicably coupled in any appropriate manner to the LWD modules 170/170A and/or the MWD module 180.

The LWD modules 170/170A and/or the MWD module 180 comprise a downhole tool configured to obtain downhole a sample of fluid from the subterranean formation and perform DFA to estimate or determine composition and/or other characteristics of the obtained fluid sample. Such DFA is according to one or more aspects described elsewhere herein. The downhole fluid analyzer of the LWD modules 170/170A and/or the MWD module 180, or another component of the BHA 150, may then report the composition data to the logging and control unit 190.

Figure 2:
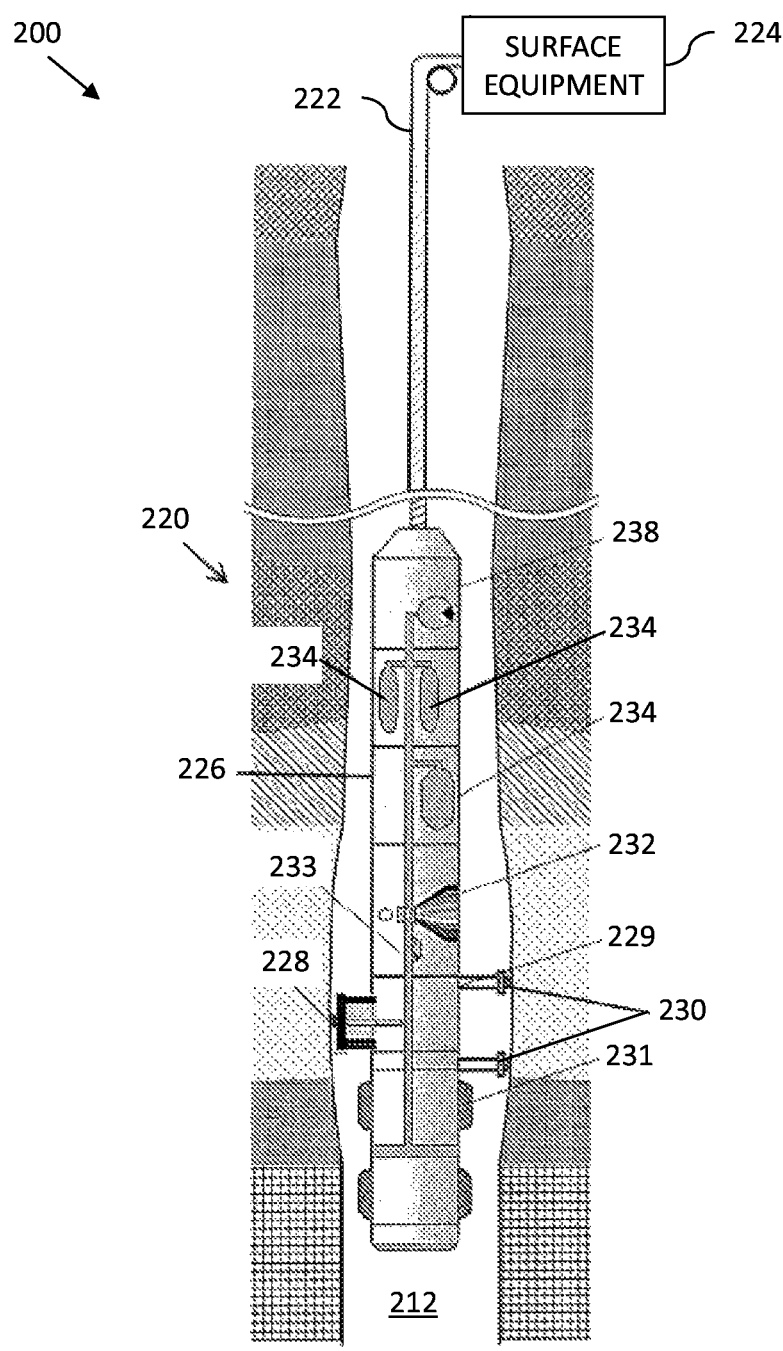
FIG. 2 is a schematic view of apparatus according to one or more aspects of the present disclosure.

FIG. 2 is a schematic view of another an example operating environment of the present disclosure wherein a downhole tool 220 is suspended at the end of a wireline 222 at a wellsite having a borehole 212. The downhole tool 220 and wireline 222 are structured and arranged with respect to a service vehicle (not shown) at the wellsite. As with the system 100 shown in FIG. 1, the example system 200 of FIG. 2 may be utilized for downhole sampling and analysis of formation fluids. The system 200 includes the downhole tool 220, which may be used for testing earth formations and analyzing the composition of fluids from a formation, and also includes associated telemetry and control devices and electronics, and surface control and communication equipment 224. The downhole tool 220 is suspended in the borehole 212 from the lower end of the wireline 222, which may be a multi-conductor logging cable spooled on a winch (not shown). The wireline 222 is electrically coupled to the surface equipment 224.

The downhole tool 220 comprises an elongated body 226 encasing a variety of electronic components and modules, which are schematically represented in FIG. 2, for providing certain functionality to the downhole tool 220. A selectively extendible fluid admitting assembly 228 and one or more selectively extendible anchoring members 230 are respectively arranged on opposite sides of the elongated body 226. The fluid admitting assembly 228 is operable to selectively seal off or isolate selected portions of the borehole wall 212 such that pressure or fluid communication with the adjacent formation may be established. The fluid admitting assembly 228 may be or comprise a single probe module 229 and/or a packer module 231.

One or more fluid sampling and analysis modules 232 are provided in the tool body 226. Fluids obtained from the formation and/or borehole flow through a flowline 233, via the fluid analysis module or modules 232, and then may be discharged through a port of a pumpout module 238. Alternatively, formation fluids in the flowline 233 may be directed to one or more fluid collecting chambers 234 for receiving and retaining the fluids obtained from the formation for transportation to the surface.

The fluid admitting assemblies, one or more fluid analysis modules, the flow path and the collecting chambers, and other operational elements of the downhole tool 220 may be controlled by one or more electrical control systems within the downhole tool 220 and/or the surface equipment 224. For example, such control system(s) may include processor capability for characterization of formation fluids in the downhole tool 220 according to one or more aspects of the present disclosure. Methods within the scope of the present disclosure may be embodied in one or more computer programs that run in a processor located, for example, in the downhole tool 220 and/or the surface equipment 224. Such programs may be configured to utilize data received from, for example, the fluid sampling and analysis module 232, via the wireline cable 222, and to transmit control signals to operative elements of the downhole tool 220. The programs may be stored on a suitable computer usable storage medium associated with the one or more processors of the downhole tool 220 and/or surface equipment 224, or may be stored on an external computer usable storage medium that is electronically coupled to such processor(s). The storage medium may be any one or more of known or future-developed storage media, such as a magnetic disk, an optically readable disk, flash memory or a readable device of any other kind, including a remote storage device coupled over a switched telecommunication link, among others.

FIGS. 1 and 2 illustrate mere examples of environments in which one or more aspects of the present disclosure may be implemented. For example, in addition to the drillstring environment of FIG. 1 and the wireline environment of FIG. 2, one or more aspects of the present disclosure may be applicable or readily adaptable for implementation in other environments utilizing other means of conveyance within the wellbore, including coiled tubing, pipe, slickline, and others.

Figure 3:
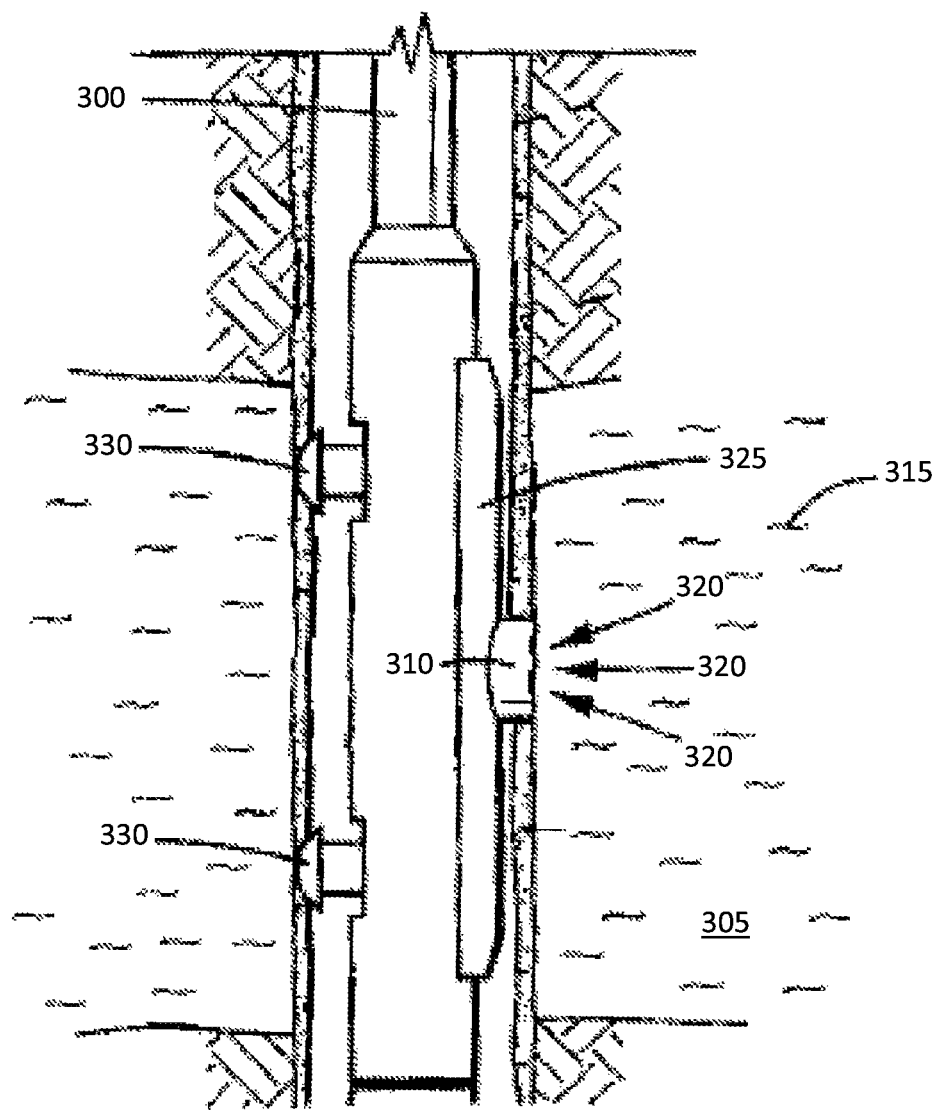
FIG. 3 is a schematic view of apparatus according to one or more aspects of the present disclosure.

An example downhole tool or module 300 that may be utilized in the example systems 100 and 200 of FIGS. 1 and 2, respectively, such as to obtain a static or flowing sample of fluid from a subterranean formation 305 and perform DFA to determine optical transmission intensity within the obtained fluid sample, is schematically shown in FIG. 3. The tool 300 is provided with a probe 310 for establishing fluid communication with the formation 305 and drawing formation fluid 315 into the tool, as indicated by arrows 320. The probe 310 may be positioned in a stabilizer blade 325 of the tool 300 and extended therefrom to engage the borehole wall. The stabilizer blade 325 may be or comprise one or more blades that are in contact with the borehole wall. Alternatively, or additionally, the tool 300 may comprise backup pistons 330 configured to press the tool 300 and, thus, the probe 310 into contact with the borehole wall. Fluid drawn into the tool 300 via the probe 310 may be measured to determine, for example, pretest and/or pressure parameters. Additionally, the tool 300 may be provided with chambers and/or other devices for collecting fluid samples for retrieval at the surface.

Figure 4:
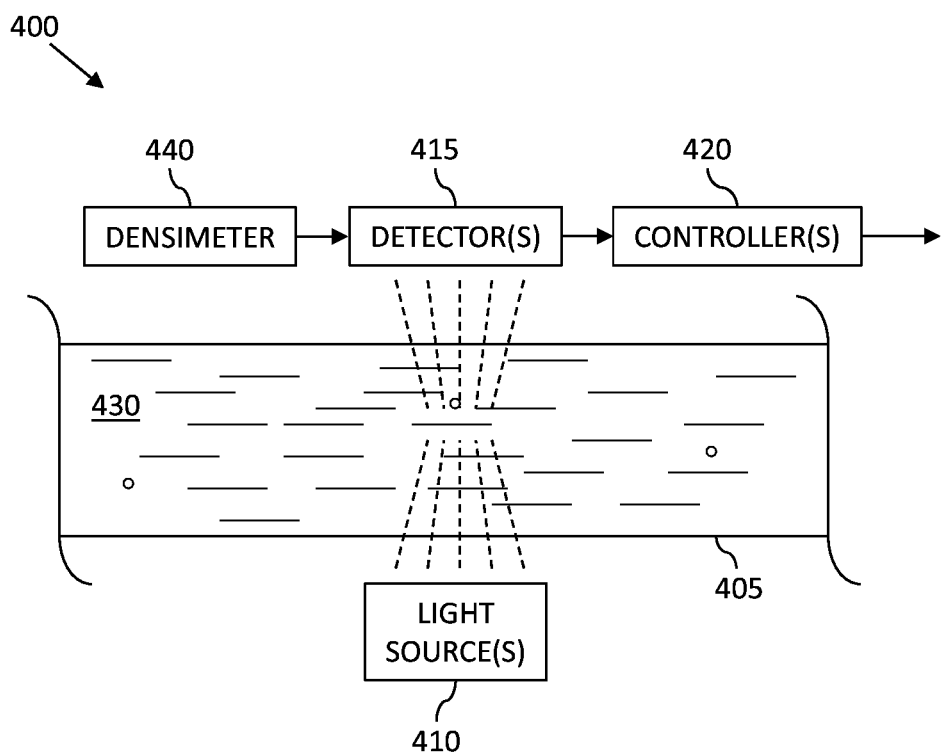
FIG. 4 is a schematic view of apparatus according to one or more aspects of the present disclosure.

An example downhole fluid analyzer 400 that may be used to implement DFA in the example downhole tool 300 shown in FIG. 3 is schematically shown in FIG. 4. The downhole fluid analyzer 400 may be part of or otherwise work in conjunction with a downhole tool configured to obtain a sample of fluid 430 from the formation, such as the downhole tools/modules shown in FIGS. 1-3. For example, a flowline 405 of the downhole tool may extend past an optical spectrometer having one or more light sources 410 and one or more detector(s) 415. Thus, although the example shown in FIG. 4 depicts one detector 415, other embodiments within the scope of the present disclosure may comprise more than one detector 415, such as where multiple detectors 415 are disposed adjacent or proximate one another along the flowline 405.

The detector(s) 415 senses light that has transmitted through the formation fluid 430 in the flowline 405, resulting in optical spectra that may be utilized according to one or more aspects of the present disclosure. For example, one or more controller(s) 420 associated with the downhole fluid analyzer 400 and/or the downhole tool may utilize measured optical spectra to determine or estimate the fluid properties of the formation fluid 430 in the flowline 405 according to one or more aspects of DFA introduced herein. The resulting information may then be reported via any form of telemetry to surface equipment, such as the logging and control unit 190 shown in FIG. 1 or the surface equipment 224 shown in FIG. 2. Moreover, the downhole fluid analyzer 400 may perform the bulk of its processing downhole and report just a relatively small amount of measurement data up to the surface. Thus, the downhole fluid analyzer 400 may provide high-speed (e.g., real time) DFA measurements using a relatively low bandwidth telemetry communication link. As such, the telemetry communication link may be implemented by most types of communication links, unlike conventional DFA techniques that may utilize high-speed communication links to transmit high-bandwidth signals to the surface.

The downhole fluid analyzer 400 may also comprise a densimeter 440 co-located with the spectrometer light source(s) 410 and/or the detector(s) 415 along the flowline 405. As a result of the co-location of the spectrometer(s) 410/415 and the densimeter 440, the downhole fluid analyzer 400 may obtain both density and optical density measurements of substantially the same fluid sample. That is, the fluid in the flowline 405 flowing past the densimeter 440 substantially immediately thereafter flows past the spectrometer(s) 410/415. Consequently, the density and optical density measurements may be considered to be obtained substantially simultaneously. In addition, while the fluid in the flowline 405 depicted in FIG. 4 encounters the densimeter 440 before (although very little before) it encounters the spectrometer(s) 410/415, such order is not limited within the scope of the present disclosure, and may be reversed, for example.

The densimeter 440 may comprise any sensing apparatus configured to assess density of the fluid flowing within the flowline 405. For example, the densimeter 440 may be or comprise a DV-rod apparatus having a vibrating sensor that oscillates in perpendicular modes within the fluid in the flowline 405. However, other types of densimeters and/or other density sensors are also within the scope of the present disclosure.

Contamination monitoring that utilizes optical measurements may be based on the Beer Lambert law, which establishes a linear relationship between the optical absorbance (i.e., optical density, OD) and the concentrations of species under investigation. For a binary mixture of formation oil and mud filtrate, the measured $OD_\lambda$ at the wavelength $\lambda$ is linearly related to the contamination level by the linear mixing law set forth below in Equation (1).

$$OD_\lambda = \eta_V OD_{\lambda,fil} + (1-\eta_V) OD_{\lambda,oil} \qquad (1)$$

where $OD_{\lambda,fil}$ is the optical density of mud filtrate at the wavelength $\lambda$, $OD_{\lambda,oil}$ is the optical density of formation oil at the wavelength $\lambda$, and $\eta_V$ is the contamination level in volume fraction. Assuming that $\eta_V$ changes with respect to the pumping time, the values of $OD_\lambda$ would reflect the changes in contamination level in the sampled fluid.

Based on Equation (1), the contamination can be derived from the measured $OD_\lambda$ as set forth below in Equation (2):

$$\eta_V = \frac{OD_{\lambda,oil} - OD_\lambda}{OD_{\lambda,oil} - OD_{\lambda,fill}} \qquad (2)$$

$OD_{\lambda,fil}$ and $OD_{\lambda,oil}$ may be unknown. However, the value of $OD_{\lambda,fil}$ at selected wavelength channels may be negligible (i.e., close to zero (0)). That is, based on filtrate spectra acquired in a laboratory, this assumption may be justified for some color channels. For other wavelength channels where $OD_{\lambda,fil}$ isn't neglible (e.g., doesn't equal zero (0)), $OD_{\lambda,fil}$ may be determined from the optical density cross-plot with respect to the selected color channels. Additionally, a long-time behavior of the fluid-flow model may be established to extrapolate the existing data. Such model may be based on a theoretical model describing the long-time behavior of fluid flow into the flowline of a downhole sampling tool via a probe pressed against the borehole wall (e.g., the downhole sampling tool 220 and probe (module) 228 of FIG. 2 and/or the downhole tool 300 and probe 310 of FIG. 3). Thus, the optical density ($OD_\lambda(t)$) may be observed as a function of pumping time, and may then be modeled as set forth below in Equation (3):

$$OD_\lambda(t) = C - Dt^{-\alpha} \qquad (3)$$

where C is the unknown asymptotic value of $OD_\lambda(t)$, D is an unknown constant, and $\alpha$ is a decay value usually within a range of 0.2 to 0.8 and reasonably approximated as about 0.5, although other values are also within the scope of the present disclosure. A single functional form $t^{-5/12}$ evolving in pumping time (i.e., t) may be derived empirically as the fluid flow model. When describing the data buildup or builddown behavior if the pumping rate was not constant during the sampling job (which is not uncommon), then a time-based model as represented above by Equation (3) may be replaced with a volume-based model as set forth below in Equation (4):

$$OD_\lambda(v) = C - Dv^{-\alpha} \qquad (4)$$

where $v$ is the accumulated pumped volume. The decay rate $\alpha$ in the model may also be estimated from the data.

Estimation of the optical density of unknown formation oils (i.e., $OD_{\lambda,oil}$) may be addressed by fitting the model of Equation (3) or (4) with the recorded data, and then extrapolating the result of such fitting to obtain the optical density of the formation oil. However, some data may not fit such models. With focused sampling, for example, the fluid flowing into the probe is either commingled or split into the sample and guard flowlines during pumping. When switching from the commingled flow to the split flow, the recorded OD data in the sample and guard line may jump as a result of the abrupt change in contamination level before and after the split. Fitting this type of data with the models of Equations (3) and (4) is invalid for extrapolation and determination of $OD_{\lambda,oil}$. As another example, sampling procedures utilizing dual packers may also not fit the models of Equations (3) and (4) because the OD data during pumping may not exhibit buildup or builddown behavior.

However, a densimeter located along the flowline (such as the densimeter 440 shown in FIG. 4) may be utilized to determine the filtrate contamination level. The density of the fluid mixture in the flowline is linearly related to the density of uncontaminated formation oil $\rho_{oil}$ and the density of filtrate $\rho_{fil}$, as set forth below in Equation (5):

$$\rho = \eta_V \rho_{fil} + (1 - \eta_V) \rho_{oil} \qquad (5)$$

where $\rho$ is the measured density and $\eta_V$ is the contamination level in volume fraction. From Equation (5), the contamination in volume percent may also be expressed as set forth below in Equation (6):

$$\eta_V = \frac{\rho_{oil} - \rho}{\rho_{oil} - \rho_{fil}} \qquad (6)$$

Thus, determining the contamination level using Equation (6) utilizes $\rho_{oil}$ and $\rho_{fil}$. The density of uncontaminated formation oil $\rho_{oil}$ may be determined from a pressure gradient based on pressure measurements at a plurality of depths. The density of filtrate $\rho_{fil}$ may be obtained using the density table of the original base oil (e.g., measured at various temperatures and/or pressures), or it may be measured on site with a filtrate sample. The density of filtrate $\rho_{fil}$ may also or alternatively be estimated using density measurements made by the densimeter at the beginning of pumping while the breakthrough of formation oil has yet not occurred.

Even though $\rho_{oil}$ and $\rho_{fil}$ may be determined in the above manners, the resulting contamination based on Equation (6) may have limited practicality. For example, the dynamic range of fluid density may be smaller than desired, and it may also be related to the accuracy of the densimeter measurements. For example, a DV-rod sensor may have an accuracy of about ±0.01 g/cc, which when coupled with the small dynamic range may translate into an unacceptably large error in the resulting contamination level. Consider an example flowline fluid mixture having $\rho_{oil}$=0.9 g/cc and $\rho_{fil}$=0.7 g/cc. The measured density $\rho$=0.89 g/cc corresponds to a contamination level of 5%. With an error of about ±0.01 g/cc in the measured density, the contamination based on Equation (6) may be subject to error larger than about ±5%.

The present disclosure, however, introduces one or more aspects of contamination monitoring in which multiple fluid sensors are co-located or otherwise proximate one another along the flowline. Co-location allows the sensors to measure multiple fluid properties of the same fluid mixture in real-time. By combining the different types of measurements from multiple co-located or otherwise proximate sensors according to one or more aspects introduced herein, the contamination level may be determined more accurately. For example, measurements from the co-located or otherwise proximate optical spectrometer and densimeter may be utilized to monitor contamination with an accuracy that may not be independently obtainable with individual sensors.

Figure 5:
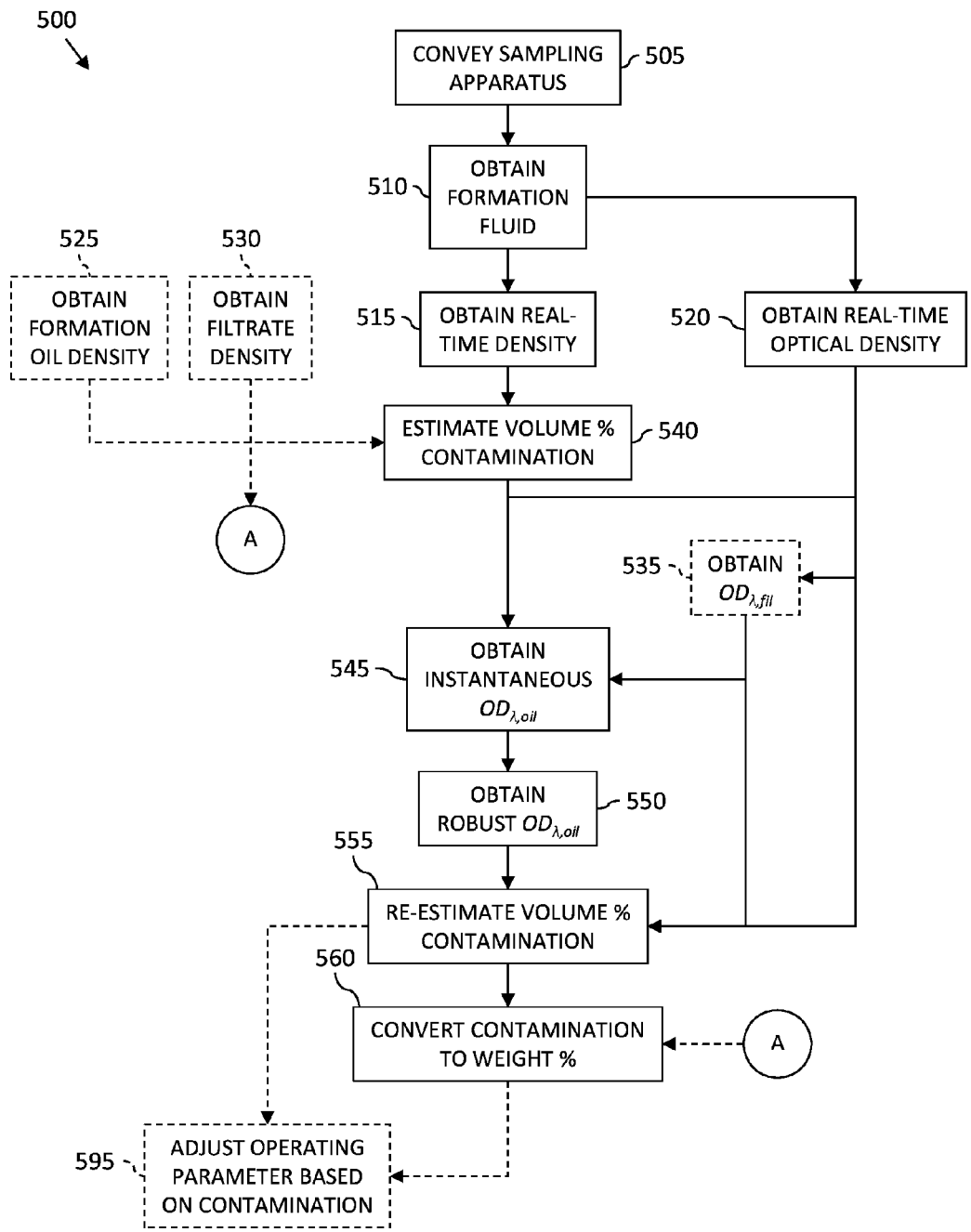
FIG. 5 is a flow-chart diagram of at least a portion of a method according to one or more aspects of the present disclosure.

FIG. 5 is a flow-chart diagram of at least a portion of a method 500 according to one or more aspects of the present disclosure. The method 500 may be at least partially performed by apparatus similar or identical to those shown in the previous figures, described above, or otherwise within the scope of the present disclosure. For example, the method 500 includes a step 505 during which a downhole sampling tool is conveyed along a borehole extending into a subterranean formation, wherein the downhole sampling tool may have one or more aspects in common with the apparatus 170/170A/180 shown in FIG. 1 and/or the apparatus 220 shown in FIG. 2, and may further be part of a BHA having one or more aspects in common with the BHA 150 shown in FIG. 1. The downhole sampling tool may be conveyed via wireline, one or more strings of tubulars (including drillstring and/or wired drill pipe), and/or other means.

Once reaching the desired subterranean formation or station within the borehole, the downhole sampling tool obtains formation fluid from the formation during a step 510. After formation fluid begins flowing through the flowline of the downhole sampling tool, real-time density measurements are initiated during step 515 and real-time optical density measurements (spectral data) are initiated during step 520. The real-time density and optical density measurements may be then obtained substantially continuously while formation fluid continues to flow within the flowline of the downhole sampling tool, or otherwise within the remaining duration of the method 500. Such data associated with the formation fluid flowing through the downhole sampling tool may be obtained, at least in part, via a multi-channel optical sensor of the downhole sampling tool, such as the optical detector 415 and/or a larger portion or all of the downhole fluid analyzer 400, each shown in FIG. 4 and described above. The sensor, detector, spectrometer and/or analyzer utilized to obtain the data during step 520 may be or comprise a 20-channel spectrometer, although spectrometers utilizing more or less than 20 channels are also within the scope of the present disclosure.

As discussed above, determining contamination may utilize knowledge of the uncontaminated formation oil density $\rho_{oil}$ and the filtrate density $\rho_{fil}$. Thus, the method 500 may comprise determining the uncontaminated formation oil density $\rho_{oil}$ during a step 525 and/or determining the filtrate density $\rho_{fil}$ during a step 530. For example, in step 525, the uncontaminated formation oil density $\rho_{oil}$ may be determined from a pressure gradient that is based on formation pressure measurements at multiple depths, although other methods are also within the scope of the present disclosure. In step 530, for example, the filtrate density $\rho_{fil}$ may be determined by one or more downhole measurements and/or one or more methods executed at surface, although other methods are also within the scope of the present disclosure. However, steps 525 and 530 may be executed as part of the method 500 shown in FIG. 5 or, alternatively, as steps that are separate from the method 500. Moreover, the scope of the present disclosure is not limited to any particular manner or method for obtaining the uncontaminated formation oil density $\rho_{oil}$ and the filtrate density $\rho_{fil}$. Accordingly, obtaining the uncontaminated formation oil density $\rho_{oil}$ and the filtrate density $\rho_{fil}$ are represented as optional steps 525 and 530 in FIG. 5.

The method 500 may also comprise obtaining the wavelength-dependent optical density of the filtrate $OD_{\lambda,fil}$ during a step 535. For example, step 535 may comprise selecting a known wavelength channel at which the optical density OD response to the filtrate is equal to or about zero (0). Alternatively, if the wavelength-dependent optical density of the filtrate $OD_{\lambda,fil}$ is not equal to or about zero (0) for the selected channel, its value may be determined from the optical density cross-plot with respect to the selected color channel. Regardless of how the wavelength-dependent optical density of the filtrate $OD_{\lambda,fil}$ is determined during step 535, however, such determination may be executed as part of the method 500 shown in FIG. 5 or, alternatively, separately from the method 500. Accordingly, obtaining the wavelength-dependent optical density of the filtrate $OD_{\lambda,fil}$ is represented as an optional step 535 in FIG. 5.

The method 500 also comprises estimating contamination in volume percent during a step 540. For example, the real-time density $\rho$ initially obtained during step 515, the uncontaminated formation oil density $\rho_{oil}$ obtained during step 525, and the filtrate density $\rho_{fil}$ obtained during step 530 may be utilized with Equation (6) to provide an initial estimate for the contamination level in volume percent $\eta_V$.

Although they are depicted in FIG. 5 as being executed in a particular sequence, the method 500 may comprise substantially simultaneously estimating the contamination level in volume percent $\eta_V$ (step 540), determining the wavelength-dependent optical density of the filtrate $OD_{\lambda,fil}$ (step 535), obtaining the real-time spectral data $OD_\lambda$ (step 520), and obtaining the real-time density (step 515). However, the scope of the present disclosure is not limited to either such simultaneous actions or the serial execution depicted in FIG. 5, and is considered to include other variations to the explicit examples provided above.

The method 500 also comprises obtaining an instantaneous estimate of wavelength-dependent optical density of uncontaminated formation oil $OD_{\lambda,oil}$ during a step 545. For example, step 545 may comprise utilizing the real-time spectral data $OD_\lambda$ obtained during step 520, the wavelength-dependent optical density of the filtrate $OD_{\lambda,fil}$ determined during step 535, and the contamination level in volume percent $\eta_V$ estimated during step 540 to obtain an instantaneous estimate of the wavelength-dependent optical density of uncontaminated formation oil $OD_{\lambda,oil}$ as set forth below in Equation (7):

$$OD_{\lambda,oil} = \frac{OD_\lambda - \eta_V OD_{\lambda,fil}}{1 - \eta_V} \quad (7)$$

The instantaneous estimate of the wavelength-dependent optical density of uncontaminated formation oil $OD_{\lambda,oil}$ determined during step 545 may be noisy and/or erroneous, and thus may not provide a practical solution. However, the method 500 comprises a subsequent step 550 during which a more robust estimate of the wavelength-dependent optical density of uncontaminated formation oil $OD_{\lambda,oil}$ is obtained based on accumulated instantaneous estimates of the wavelength-dependent optical density of uncontaminated formation oil $OD_{\lambda,oil}$ determined during step 545. For example, the accumulated instantaneous estimates of the wavelength-dependent optical density of uncontaminated formation oil $OD_{\lambda,oil}$ determined during step 545 may be utilized to form a distribution from which the robust estimate of the wavelength-dependent optical density of uncontaminated formation oil $OD_{\lambda,oil}$ may be derived, such as by determining the mean of the accumulated instantaneous estimates of the wavelength-dependent optical density of uncontaminated formation oil $OD_{\lambda,oil}$ determined during step 545. Other robust estimation schemes also within the scope of the present disclosure include determining a trimmed mean or median of distribution as the robust estimate of the wavelength-dependent optical density of uncontaminated formation oil $OD_{\lambda,oil}$. In any case, it should be noted that the flowline may be filled with mud during clean-up at the beginning of pumping, which may saturate the optical density data. Thus, the step 550 and/or another portion of the method 500 may exclude such saturated data, such as by selecting an appropriate starting instance for obtaining the instantaneous estimates of the wavelength-dependent optical density of uncontaminated formation oil $OD_{\lambda,oil}$ during step 545. However, selecting the starting instance may also be based on accumulating a sufficient enough number of instantaneous estimates of the wavelength-dependent optical density of uncontaminated formation oil $OD_{\lambda,oil}$ during step 545 to obtain the more robust estimation during step 550.

During a subsequent step 555, the contamination level in volume percent $\eta_V$ may be estimated based on the robust estimate of the wavelength-dependent optical density of uncontaminated formation oil $OD_{\lambda,oil}$ determined during step 550, the spectral data obtained during step 520, and the wavelength-dependent optical density of the filtrate $OD_{\lambda,fil}$ determined during step 535. For example, Equation (2) above may be utilized to estimate the contamination level in volume percent $\eta_V$ during step 555. The contamination level in volume percent $\eta_V$ estimated during step 555 may then be converted to contamination in weight percent $\eta_W$ during a subsequent step 560. For example, such conversion may be as set forth below in Equation (8).

$$\eta_w = \frac{\rho_{fil}\eta_V}{\rho_{oil}(1 - \eta_V) + \rho_{fil}\eta_V} \quad (8)$$

Although not explicitly depicted in FIG. 5, the method 500 may also comprise transmitting the contamination level in volume percent $\eta_V$ estimated during step 555 and/or the contamination level in weight percent $\eta_W$ determined during step 560 to surface, such as to a real-time plotter and/or other display. The method 500 may also comprise preprocessing of the spectral data obtained during step 520. For example, such preprocessing may comprise removing the effects of optical scattering from the spectral data by subtracting the optical density of a baseline channel (e.g., the channel at the wavelength of 1600 nm) from the selected data channel. Other preprocessing of the spectral data obtained during step 520 may also be within the scope of the present disclosure.

The method 500 may also comprise a step 595 during which an operational parameter of the downhole sampling tool may be adjusted based on the contamination level determined during step 555 or step 560. For example, step 595 may comprise initiating storage of a sample of the formation fluid flowing through the downhole sampling tool based on the determined contamination level. Alternatively, or additionally, step 595 may comprise adjusting a rate of pumping of formation fluid into the downhole sampling tool based on the determined contamination level. Adjustment of the operational parameter during step 595 may also or alternatively be based on the results of one or more other steps of the method 500.

Figure 6:
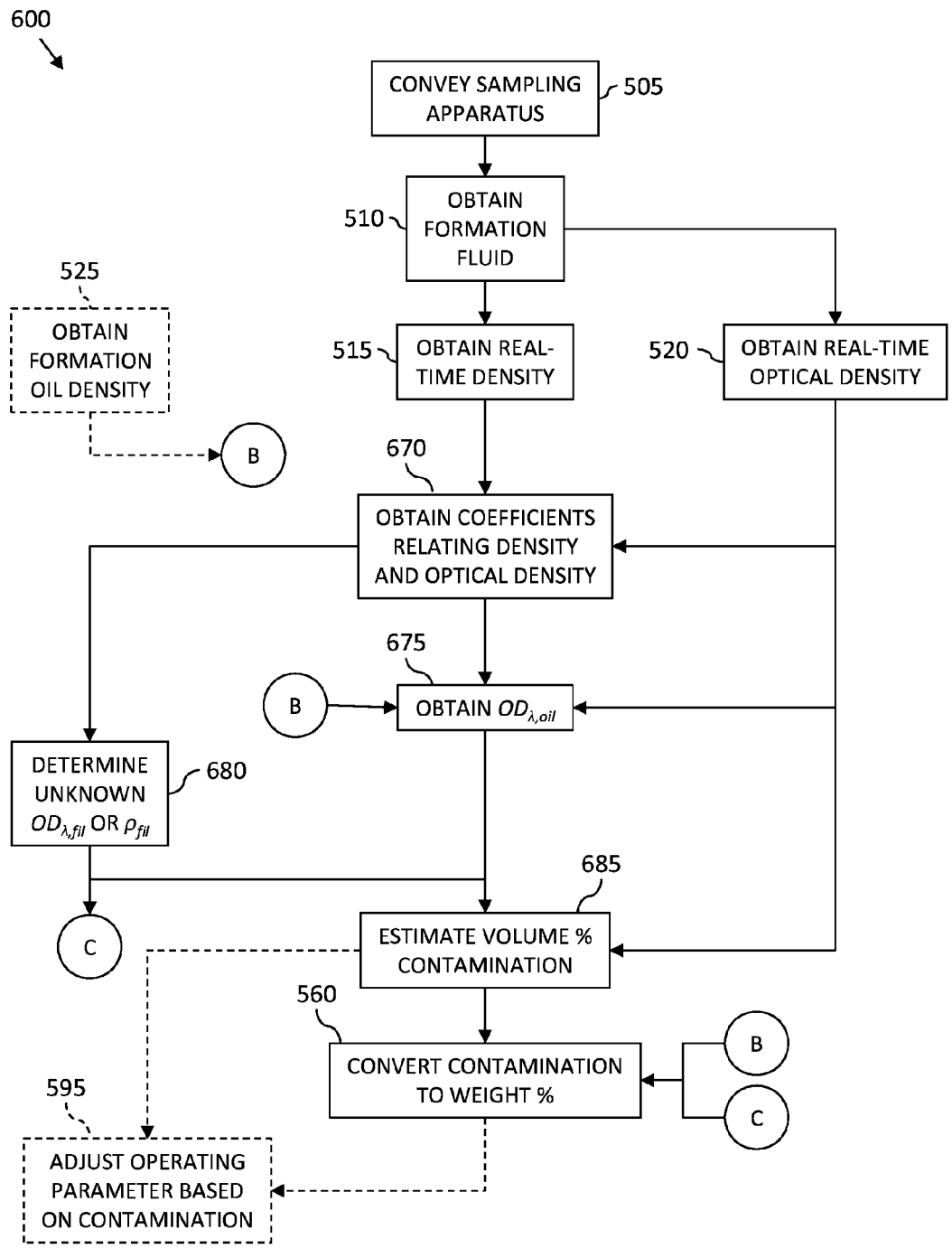
FIG. 6 is a flow-chart diagram of at least a portion of a method according to one or more aspects of the present disclosure.

FIG. 6 is a flow-chart diagram of at least a portion of a method 600 according to one or more aspects of the present disclosure. The method 600 may be substantially similar to the method 500 shown in FIG. 5 except as described below, and may be at least partially performed by apparatus similar or identical to those shown in the previous figures, described above, or otherwise within the scope of the present disclosure. For example, the method 600 includes step 505 during which the downhole sampling tool is conveyed along the borehole extending into the subterranean formation, wherein the downhole sampling tool may have one or more aspects in common with the apparatus 170/170A/180 shown in FIG. 1 and/or the apparatus 220 shown in FIG. 2, and may further be part of a BHA having one or more aspects in common with the BHA 150 shown in FIG. 1. The downhole sampling tool may be conveyed via wireline, one or more strings of tubulars (including drillstring and/or wired drill pipe), and/or other means. Once reaching the desired subterranean formation or station within the borehole, the downhole sampling tool obtains formation fluid from the formation during step 510. After formation fluid begins flowing through the flowline of the downhole sampling tool, real-time density measurements are initiated during step 515 and real-time optical density measurements (spectral data) are initiated during step 520. The real-time density and optical density measurements may be then obtained substantially continuously as formation fluid continues to flow within the flowline of the downhole sampling tool, or otherwise within the remaining duration of the method 600.

The method 600 also comprises a step 670 during which coefficients relating density and optical density are determined based on Equation (9) set forth below:

$$OD_\lambda = A + B\rho \qquad (9)$$

The coefficients A and B may be defined as set forth below in Equations (10) and (11):

$$A = \frac{OD_{\lambda,fil}\rho_{oil} - OD_{\lambda,oil}\rho_{fil}}{\rho_{oil} - \rho_{fil}} \qquad (10)$$

$$B = \frac{OD_{\lambda,oil} - OD_{\lambda,fil}}{\rho_{oil} - \rho_{fil}} \qquad (11)$$

For example, determining the coefficients A and B during step 670 may comprise treating the real-time density $\rho$ obtained during step 515 as the independent variable and the real-time optical density $OD_\lambda$ obtained during step 520 as the dependent variable, and then fitting the data with Equation (9).

The method 600 may also comprise step 525 during which the uncontaminated formation oil density $\rho_{oil}$ is obtained, such as may be determined from or otherwise based on the pressure gradient, as described above. The uncontaminated formation oil density $\rho_{oil}$ obtained during step 525 may then be utilized during a subsequent step 675 to obtain the wavelength-dependent optical density of unknown formation oil $OD_{\lambda,oil}$ by substituting the uncontaminated formation oil density $\rho_{oil}$ in Equation (9) with A and B determined by the fitting process.

The method 600 also comprises a step 680 during which a known one of the filtrate measurements $OD_{\lambda,fil}$ and $\rho_{fil}$ is utilized with Equations (9)-(11) to determine an unknown one of the filtrate measurements $OD_{\lambda,fil}$ and $\rho_{fil}$. That is, if $\rho_{fil}$ is known when execution of step 680 commences, then step 680 comprises determining $OD_{\lambda,fil}$, and if $OD_{\lambda,fil}$ is known when execution of step 680 commences, then step 680 comprises determining $\rho_{fil}$.

The method 600 also comprises a step 685 during which the contamination level in volume percent $n_V$ is estimated. For example, the wavelength-dependent optical density of the filtrate $OD_{\lambda,fil}$ determined during step 680 or otherwise, the wavelength-dependent optical density of unknown formation oil $OD_{\lambda,oil}$ obtained during step 675, and the real-time optical density $OD_\lambda$ initiated during step 520 may be utilized during step 685 to estimate the contamination level in volume percent $n_V$. The method 600 may also comprise step 560 described above, during which the estimated contamination level in volume percent $n_V$ may be converted to estimated contamination level in weight percent $n_W$ utilizing, for example, Equation (8).

The method 600 may also comprise step 595 during which an operational parameter of the downhole sampling tool may be adjusted based on the contamination level determined during step 685 or step 560. For example, step 595 may comprise initiating storage of a sample of the formation fluid flowing through the downhole sampling tool based on the determined contamination level. Alternatively, or additionally, step 595 may comprise adjusting a rate of pumping of formation fluid into the downhole sampling tool based on the determined contamination level. Adjustment of the operational parameter during step 595 may also or alternatively be based on the results of one or more other steps of the method 600.

Aspects of the present disclosure are described above in the context of contamination monitoring utilizing single-channel optical density data. However, one or more aspects of the present disclosure are applicable or readily adaptable to contamination monitoring utilizing multi-channel optical density data, including that which may contain redundant information. For example, the optical density data from multiple channels may be merged or otherwise combined to obtain an equivalent single-channel data exhibiting, for example, an improved signal-to-noise ratio. Of course, other methods are also within the scope of the present disclosure.

One or more aspects of the present disclosure may omit one or more processes for fitting measured spectral data with a power-law model (e.g., Equations (3) or (4)) and then extrapolating the result of such fitting to obtain the optical density of formation oil. Thus, for example, one or more aspects of the present disclosure may be applicable to measured spectral data that does not fit such a power-law model, such as with contamination monitoring in focused sampling or in sampling with a dual-packer.

In addition, where the wavelength-dependent optical density of formation oil is known or determined for one wavelength channel of the downhole spectrometer, one or more aspects of the present disclosure may make it possible to determine the wavelength-dependent optical density of the other wavelength channels of the downhole spectrometer. For example, this may be accomplished by utilizing the crossplot of multi-wavelength channel data in conjunction with the equations above and/or one or more other aspects of the present disclosure. Thus, one or more aspects of the present disclosure may enable obtaining a multi-channel optical density response of uncontaminated formation oil. Consequently, one or more aspects of the present disclosure may enable more accurate determination of answer products such as fluid composition and GOR (gas-oil ratio) of uncontaminated formation oil from the estimated optical response of uncontaminated formation oil.

Figure 7:
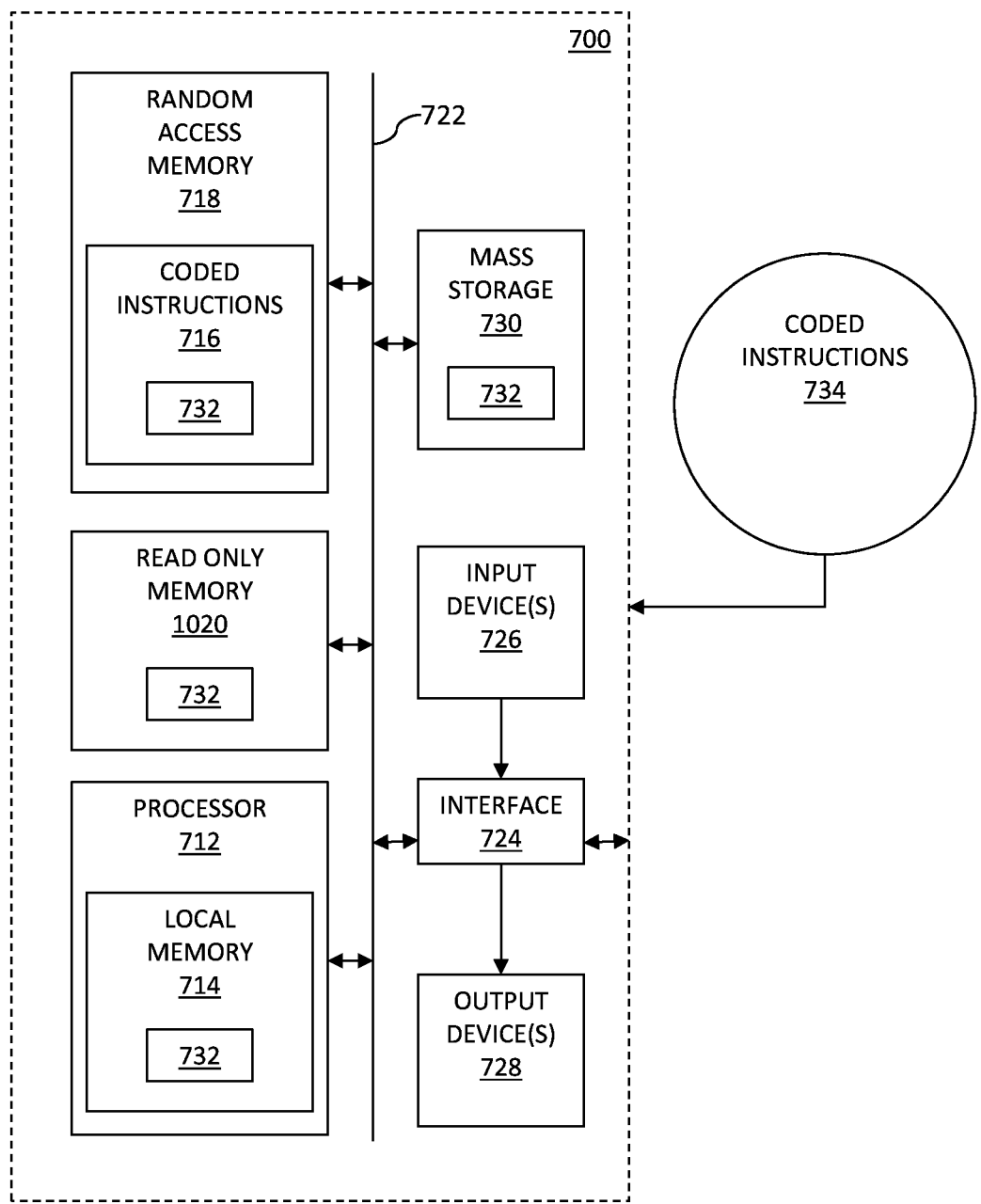
FIG. 7 is a schematic view of apparatus according to one or more aspects of the present disclosure.

FIG. 7 is a block diagram of an example processing system 700 that may execute example machine readable instructions used to implement one or more of the processes of FIGS. 5 and/or 6, and/or to implement the example downhole fluid analyzers and/or other apparatus of FIGS. 1, 2, 3 and/or 4. Thus, the example processing system 700 may be capable of implementing the apparatus and methods disclosed herein. The processing system 700 may be or comprise, for example, one or more processors, one or more controllers, one or more special-purpose computing devices, one or more servers, one or more personal computers, one or more personal digital assistant (PDA) devices, one or more smartphones, one or more internet appliances, and/or any other type(s) of computing device(s). Moreover, while it is possible that the entirety of the system 700 shown in FIG. 7 is implemented within the downhole tool, it is also contemplated that one or more components or functions of the system 700 may be implemented in surface equipment, such as the surface equipment 190 shown in FIG. 1, and/or the surface equipment 224 shown in FIG. 2. One or more aspects, components or functions of the system 700 may also or alternatively be implemented as the controller 420 shown in FIG. 4.

The system 700 comprises a processor 712 such as, for example, a general-purpose programmable processor. The processor 712 includes a local memory 714, and executes coded instructions 732 present in the local memory 714 and/or in another memory device. The processor 712 may execute, among other things, machine-readable instructions to implement the processes represented in FIGS. 5 and/or 6. The processor 712 may be, comprise or be implemented by any type of processing unit, such as one or more INTEL microprocessors, one or more microcontrollers from the ARM and/or PICO families of microcontrollers, one or more embedded soft/hard processors in one or more FPGAs, etc. Of course, other processors from other families are also appropriate.

The processor 712 is in communication with a main memory including a volatile (e.g., random access) memory 718 and a non-volatile (e.g., read only) memory 720 via a bus 722. The volatile memory 718 may be, comprise or be implemented by static random access memory (SRAM), synchronous dynamic random access memory (SDRAM), dynamic random access memory (DRAM), RAMBUS dynamic random access memory (RDRAM) and/or any other type of random access memory device. The non-volatile memory 720 may be, comprise or be implemented by flash memory and/or any other desired type of memory device. One or more memory controllers (not shown) may control access to the main memory 718 and/or 720.

The processing system 700 also includes an interface circuit 724. The interface circuit 724 may be, comprise or be implemented by any type of interface standard, such as an Ethernet interface, a universal serial bus (USB) and/or a third generation input/output (3GIO) interface, among others.

One or more input devices 726 are connected to the interface circuit 724. The input device(s) 726 permit a user to enter data and commands into the processor 712. The input device(s) may be, comprise or be implemented by, for example, a keyboard, a mouse, a touchscreen, a track-pad, a trackball, an isopoint and/or a voice recognition system, among others.

One or more output devices 728 are also connected to the interface circuit 724. The output devices 728 may be, comprise or be implemented by, for example, display devices (e.g., a liquid crystal display or cathode ray tube display (CRT), among others), printers and/or speakers, among others. Thus, the interface circuit 724 may also comprise a graphics driver card.

The interface circuit 724 also includes a communication device such as a modem or network interface card to facilitate exchange of data with external computers via a network (e.g., Ethernet connection, digital subscriber line (DSL), telephone line, coaxial cable, cellular telephone system, satellite, etc.).

The processing system 700 also includes one or more mass storage devices 730 for storing machine-readable instructions and data. Examples of such mass storage devices 730 include floppy disk drives, hard drive disks, compact disk drives and digital versatile disk (DVD) drives, among others.

The coded instructions 732 may be stored in the mass storage device 730, the volatile memory 718, the non-volatile memory 720, the local memory 714 and/or on a removable storage medium, such as a CD or DVD 734.

As an alternative to implementing the methods and/or apparatus described herein in a system such as the processing system of FIG. 7, the methods and or apparatus described herein may be embedded in a structure such as a processor and/or an ASIC (application specific integrated circuit).

In view of all of the above and the figures, those having ordinary skill in the art should readily recognize that the present disclosure introduces a method comprising: conveying a downhole sampling tool within a borehole extending into a subterranean formation; operating the downhole sampling tool to obtain formation fluid from the subterranean formation; flowing the obtained formation fluid through a flowline of the downhole sampling tool; obtaining real-time measurements of the formation fluid flowing through the flowline, including obtaining real-time density measurements and obtaining real-time optical density measurements; and estimating actual contamination of the formation fluid flowing through the flowline based on the obtained real-time measurements. The method may further comprise: obtaining wavelength-dependent optical density of uncontaminated formation oil for one wavelength channel of a spectrometer of the downhole sampling tool; determining wavelength-dependent optical density of uncontaminated formation oil for other wavelength channels of the spectrometer based on the obtained wavelength-dependent optical density of formation oil for the one wavelength channel; obtaining a multi-channel optical density response of uncontaminated formation oil based on the obtained wavelength-dependent optical density of uncontaminated formation oil for the one wavelength channel and the determined wavelength-dependent optical density of uncontaminated formation oil for the other wavelength channels; and determining a composition and/or GOR of uncontaminated formation oil based on the obtained multi-channel optical density response of uncontaminated formation oil. Determining the wavelength-dependent optical density of uncontaminated formation oil for the other wavelength channels of the spectrometer based on the obtained wavelength-dependent optical density of formation oil for the one wavelength channel may utilize a cross-plot of multi-wavelength channel data;

Conveying the downhole sampling tool along the borehole may comprise conveying the downhole sampling tool along the borehole via wireline or drill string.

Obtaining the real-time measurements of the formation fluid flowing through the flowline may comprise substantially continuously obtaining the real-time measurements.

Obtaining the real-time optical density measurements of the formation fluid flowing through the flowline may comprise operating a 20-channel and/or other multi-channel optical sensor of the downhole sampling tool.

The method may further comprise determining an uncontaminated formation oil density, and estimating the actual contamination of the formation fluid may be further based on the determined uncontaminated formation oil density.

The method may further comprise determining an uncontaminated formation oil density based on a pressure gradient that is based on formation pressure measurements at multiple depths, and estimating the actual contamination of the formation fluid may be further based on the determined uncontaminated formation oil density.

The method may further comprise determining a filtrate density, and estimating the actual contamination of the formation fluid may be further based on the determined filtrate density.

The method may further comprise determining a filtrate density based on at least one downhole measurement, and estimating the actual contamination of the formation fluid may be further based on the determined filtrate density.

The method may further comprise determining a filtrate density via surface equipment, and estimating the actual contamination of the formation fluid may be further based on the determined filtrate density.

The method may further comprise obtaining a wavelength-dependent optical density of filtrate, and estimating the actual contamination of the formation fluid may be further based on the obtained wavelength-dependent optical density of the filtrate.

The method may further comprise obtaining a wavelength-dependent optical density of filtrate by selecting a known wavelength channel at which optical density response to the filtrate is substantially zero, and estimating the actual contamination of the formation fluid may be further based on the obtained wavelength-dependent optical density of the filtrate.

The method may further comprise obtaining a wavelength-dependent optical density of filtrate by selecting a known wavelength channel at which optical density response to the filtrate is substantially not zero and determining the wavelength-dependent optical density of the filtrate from an optical density cross-plot with respect to the selected wavelength channel, and estimating the actual contamination of the formation fluid may be further based on the obtained wavelength-dependent optical density of the filtrate.

The method may further comprise determining an uncontaminated formation oil density, determining a filtrate density, and estimating initial contamination based on the obtained real-time density measurements, the determined uncontaminated formation oil density, and the determined filtrate density, wherein estimating the actual contamination of the formation fluid may be further based on the estimated initial contamination.

The method may further comprise obtaining an instantaneous estimate of wavelength-dependent optical density of uncontaminated formation oil, and estimating the actual contamination of the formation fluid may be further based on the obtained instantaneous estimate of wavelength-dependent optical density of uncontaminated formation oil.

The method may further comprise determining an uncontaminated formation oil density, determining a filtrate density, and estimating initial contamination based on the obtained real-time density measurements, the determined uncontaminated formation oil density, and the determined filtrate density. The method may further comprise obtaining a wavelength-dependent optical density of filtrate, and obtaining an instantaneous estimate of wavelength-dependent optical density of uncontaminated formation oil based on the obtained real-time optical density data, the obtained wavelength-dependent optical density of the filtrate, and the estimated initial contamination.

The method may further comprise determining an uncontaminated formation oil density, determining a filtrate density, and estimating initial contamination based on the obtained real-time density measurements, the determined uncontaminated formation oil density, and the determined filtrate density. The method may further comprise obtaining a wavelength-dependent optical density of filtrate, and iteratively obtaining an instantaneous estimate of wavelength-dependent optical density of uncontaminated formation oil based on the obtained real-time optical density data, the obtained wavelength-dependent optical density of the filtrate, and the estimated initial contamination. The method may further comprise obtaining a robust estimate of the wavelength-dependent optical density of uncontaminated formation oil based on accumulated ones of the iteratively obtained instantaneous estimates of the wavelength-dependent optical density of uncontaminated formation oil. Obtaining the robust estimate of the wavelength-dependent optical density of uncontaminated formation oil based on accumulated ones of the iteratively obtained instantaneous estimates of the wavelength-dependent optical density of uncontaminated formation oil may comprise forming a distribution of the accumulated ones of the iteratively obtained instantaneous estimates of the wavelength-dependent optical density of uncontaminated formation oil, and determining the robust estimate of the wavelength-dependent optical density of uncontaminated formation oil based on the formed distribution. Determining the robust estimate of the wavelength-dependent optical density of uncontaminated formation oil based on the formed distribution may comprise determining a mean of the accumulated ones of the iteratively obtained instantaneous estimates of the wavelength-dependent optical density of uncontaminated formation oil. Estimating actual contamination of the formation fluid may be further based on the robust estimate of the wavelength-dependent optical density of uncontaminated formation oil, the obtained real-time optical density measurements, and the wavelength-dependent optical density of the filtrate.

Estimating the actual contamination of the formation fluid may comprise estimating the actual contamination in volume percent, and the method may further comprise converting the estimated actual contamination in volume percent to actual contamination in weight percent.

The method may further comprise transmitting the estimated actual contamination of the formation fluid to surface equipment.

The method may further comprise preprocessing the real-time optical density measurements, and estimating the actual contamination of the formation fluid may be based on the preprocessed real-time optical density measurements. The preprocessing may comprise removing effects of optical scattering from the real-time optical density measurements. Obtaining the real-time optical density measurements may utilize a multi-channel spectrometer, and preprocessing may comprise removing effects of optical scattering from the real-time optical density measurements by subtracting optical density of a baseline channel of the multi-channel spectrometer from optical density measured by remaining channels of the multi-channel spectrometer.

The method may further comprise adjusting an operational parameter of the downhole sampling tool based on the estimated actual contamination of the formation fluid. Adjusting an operational parameter of the downhole sampling tool may comprise initiating storage of a sample of the formation fluid and/or adjusting a rate of pumping of formation fluid into the downhole sampling tool.

The method may further comprise determining first and second coefficients collectively relating density and optical density of the formation fluid. Wavelength-dependent optical density of the formation fluid may be substantially equal to the sum of the first coefficient and the product of the second coefficient and density of the formation fluid. Determining the first and second coefficients may comprise fitting the obtained real-time density and optical density measurements with the relationship between the wavelength-dependent optical density of the formation fluid, the density of the formation fluid and the first and second coefficients. The method may further comprise obtaining uncontaminated formation oil density. Obtaining the uncontaminated formation oil density may be based on a pressure gradient that is based on formation pressure measurements at multiple depths. The method may further comprise obtaining wavelength-dependent optical density of unknown formation oil based on the obtained uncontaminated formation oil density. One of the filtrate density and wavelength-dependent optical density of the filtrate may be known and the other one may be unknown, and the method may further comprise determining a value of the unknown one based on the known one. Estimating actual contamination of the formation fluid may be based on the value determined for the unknown one of the filtrate density and wavelength-dependent optical density of the filtrate, the obtained wavelength-dependent optical density of formation oil, and the obtained real-time optical density measurements. Estimating the actual contamination of the formation fluid may comprise estimating the actual contamination in volume percent, and the method may further comprise converting the estimated actual contamination in volume percent to actual contamination in weight percent. The method may further comprise transmitting the estimated actual contamination of the formation fluid to surface equipment. The method may further comprise preprocessing the real-time optical density measurements, and estimating the actual contamination of the formation fluid may be based on the preprocessed real-time optical density measurements. The preprocessing may comprise removing effects of optical scattering from the real-time optical density measurements. Obtaining the real-time optical density measurements may utilize a multi-channel spectrometer, and the preprocessing may comprise removing effects of optical scattering from the real-time optical density measurements by subtracting optical density of a baseline channel of the multi-channel spectrometer from optical density measured by remaining channels of the multi-channel spectrometer.

The present disclosure also introduces an apparatus comprising: a downhole sampling tool conveyable within a wellbore extending into a subterranean formation, wherein the downhole sampling tool comprises: a flowline conducting formation fluid obtained from the subterranean formation via operation of the downhole sampling tool; a plurality of co-located sensors proximate the flowline and including a density sensor and an optical density sensor; and a controller operable to estimate an actual contamination of the formation fluid flowing through the flowline based on real-time density and optical density measurements obtained via the plurality of co-located sensors.

The density sensor may comprise a vibrating sensor that oscillates in perpendicular modes within the formation fluid conducted in the flowline.

The downhole sampling tool may be conveyable within the wellbore via wireline or drill string.

The downhole sampling tool may further comprise a spectrometer comprising the optical density sensor. The spectrometer may be or comprise a 20-channel and/or other multi-channel spectrometer.

The controller may be further operable to preprocess the real-time optical density measurements. The preprocessing may comprise removing effects of optical scattering from the real-time optical density measurements. The controller may be further operable to adjust an operational parameter of the downhole sampling tool based on the estimated actual contamination of the formation fluid. The downhole sampling tool may further comprise a chamber for storing formation fluid obtained from the subterranean formation, and the controller may be further operable to direct obtained formation fluid into the chamber based on the estimated actual contamination of the formation fluid. The downhole sampling tool may further comprise a pump operable to pump formation fluid from the subterranean formation through the flowline, and the controller may be further operable to adjust an operating parameter of the pump based on the estimated actual contamination of the formation fluid.

The present disclosure also introduces a method comprising: conveying a downhole sampling tool within a borehole extending into a subterranean formation; operating the downhole sampling tool to obtain formation fluid from the subterranean formation; flowing the obtained formation fluid through a flowline of the downhole sampling tool; obtaining real-time measurements of the formation fluid flowing through the flowline, including: obtaining real-time density measurements via a density sensor of the downhole sampling tool; and obtaining real-time optical density measurements via a multi-channel optical sensor of the downhole sampling tool, wherein the density sensor and the multi-channel optical sensor are co-located proximate the flowline; and estimating actual contamination of the formation fluid flowing through the flowline based on the obtained real-time measurements.

The method may further comprise: obtaining wavelength-dependent optical density of uncontaminated formation oil for one wavelength channel of the multi-channel optical sensor; determining wavelength-dependent optical density of uncontaminated formation oil for other wavelength channels of the multi-channel optical sensor based on the obtained wavelength-dependent optical density of formation oil for the one wavelength channel; obtaining a multi-channel optical density response of uncontaminated formation oil based on the obtained wavelength-dependent optical density of uncontaminated formation oil for the one wavelength channel and the other wavelength channels; and determining at least one of a composition and a gas-to-oil ratio (GOR) of uncontaminated formation oil based on the obtained multi-channel optical density response of uncontaminated formation oil. Determining wavelength-dependent optical density of uncontaminated formation oil for the other wavelength channels of the spectrometer based on the obtained wavelength-dependent optical density of formation oil for the one wavelength channel may utilize a cross-plot of multi-wavelength channel data. Obtaining the real-time measurements of the formation fluid flowing through the flowline may comprise substantially continuously obtaining the real-time measurements.

The method may further comprise determining an uncontaminated formation oil density, and estimating the actual contamination of the formation fluid may be further based on the determined uncontaminated formation oil density. Determining the uncontaminated formation oil density may utilize a pressure gradient that is based on formation pressure measurements at multiple depths.

The method may further comprise determining a filtrate density, and estimating the actual contamination of the formation fluid may be further based on the determined filtrate density. Determining the filtrate density may be based on at least one downhole measurement.

The method may further comprise determining an uncontaminated formation oil density, determining a filtrate density, and estimating initial contamination based on the obtained real-time density measurements, the determined uncontaminated formation oil density, and the determined filtrate density. Estimating the actual contamination of the formation fluid may be further based on the estimated initial contamination.

The method may further comprise: obtaining a wavelength-dependent optical density of filtrate; iteratively obtaining instantaneous estimates of wavelength-dependent optical density of uncontaminated formation oil based on the obtained real-time optical density data, the obtained wavelength-dependent optical density of the filtrate, and the estimated initial contamination; and obtaining a robust estimate of the wavelength-dependent optical density of uncontaminated formation oil based on accumulated ones of the iteratively obtained instantaneous estimates of the wavelength-dependent optical density of uncontaminated formation oil. Estimating actual contamination of the formation fluid may be further based on the obtained real-time optical density measurements, the wavelength-dependent optical density of the filtrate, and at least one of: the iteratively obtained instantaneous estimates of wavelength-dependent optical density of uncontaminated formation oil; and the robust estimate of the wavelength-dependent optical density of uncontaminated formation oil.

The method may further comprise preprocessing the real-time optical density measurements to remove effects of optical scattering from the real-time optical density measurements, and estimating the actual contamination of the formation fluid may be based on the preprocessed real-time optical density measurements.

The method may further comprise adjusting an operational parameter of the downhole sampling tool based on the estimated actual contamination of the formation fluid. Adjusting an operational parameter of the downhole sampling tool may comprise at least one of initiating storage of a sample of the formation fluid within the downhole sampling tool and adjusting a rate of pumping of formation fluid into the downhole sampling tool.

The method may further comprise determining first and second coefficients collectively relating density and optical density of the formation fluid, wherein wavelength-dependent optical density of the formation fluid may be substantially equal to the sum of the first coefficient and the product of the second coefficient and density of the formation fluid. Determining the first and second coefficients may comprise fitting the obtained real-time density and optical density measurements with the relationship between the wavelength-dependent optical density of the formation fluid, the density of the formation fluid and the first and second coefficients.

The method may further comprise obtaining uncontaminated formation oil density and obtaining wavelength-dependent optical density of unknown formation oil based on the obtained uncontaminated formation oil density. One of filtrate density and wavelength-dependent optical density of the filtrate may be known and the other one may be unknown, and the method may further comprise determining a value of the unknown one based on the known one, wherein estimating actual contamination of the formation fluid may be based on the value determined for the unknown one, the obtained wavelength-dependent optical density of unknown formation oil, and the obtained real-time optical density measurements.

The present disclosure also introduces an apparatus comprising: a downhole sampling tool conveyable within a wellbore extending into a subterranean formation, wherein the downhole sampling tool comprises: a flowline conducting formation fluid obtained from the subterranean formation via operation of the downhole sampling tool; a plurality of co-located sensors proximate the flowline and including a density sensor and an optical density sensor; a multi-channel spectrometer comprising the optical density sensor; and a controller operable to estimate an actual contamination of the formation fluid flowing through the flowline based on real-time density and optical density measurements obtained via the plurality of co-located sensors. The downhole sampling tool may be conveyable within the wellbore via wireline or drill string. The density sensor may comprise a vibrating sensor that oscillates in perpendicular modes within the formation fluid conducted in the flowline. The controller may be further operable to adjust an operational parameter of the downhole sampling tool based on the estimated actual contamination of the formation fluid. Adjusting the operational parameter of the downhole sampling tool may comprise at least one of: directing obtained formation fluid into a storage chamber of the downhole sampling tool; and adjusting an operating parameter of a pump of the downhole sampling tool based on the estimated actual contamination of the formation fluid, wherein the pump is operable to pump formation fluid from the subterranean formation through the flowline.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same aspects of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

What is claimed is:

1. A method, comprising:
conveying a downhole sampling tool within a borehole extending into a subterranean formation;
operating the downhole sampling tool to obtain formation fluid from the subterranean formation;
flowing the obtained formation fluid through a flowline of the downhole sampling tool;
obtaining real-time measurements of the formation fluid flowing through the flowline, including:
obtaining real-time density measurements via a densimeter of the downhole sampling tool; and
obtaining real-time optical density measurements via a multi-channel optical sensor of the downhole sampling tool, wherein the densimeter and the multi-channel optical sensor are co-located proximate the flowline such that the real-time density measurements and the real-time optical density measurements are obtained substantially simultaneously; and
estimating actual contamination of the formation fluid flowing through the flowline based on a relation between the obtained real-time density measurements and the obtained real-time optical density measurements.

2. The method of claim 1 further comprising:
obtaining wavelength-dependent optical density of uncontaminated formation oil for one wavelength channel of the multi-channel optical sensor;
determining wavelength-dependent optical density of uncontaminated formation oil for other wavelength channels of the multi-channel optical sensor based on the obtained wavelength-dependent optical density of formation oil for the one wavelength channel;
obtaining a multi-channel optical density response of uncontaminated formation oil based on the obtained wavelength-dependent optical density of uncontaminated formation oil for the one wavelength channel and the other wavelength channels; and
determining at least one of a composition and a gas-to-oil ratio (GOR) of uncontaminated formation oil based on the obtained multi-channel optical density response of uncontaminated formation oil.

3. The method of claim 2 wherein determining wavelength-dependent optical density of uncontaminated formation oil for the other wavelength channels of the spectrometer based on the obtained wavelength-dependent optical density of formation oil for the one wavelength channel utilizes a cross-plot of multi-wavelength channel data.

4. The method of claim 1 wherein obtaining the real-time measurements of the formation fluid flowing through the flowline comprises substantially continuously obtaining the real-time measurements.

5. The method of claim 1 further comprising determining an uncontaminated formation oil density, and wherein estimating the actual contamination of the formation fluid is further based on the determined uncontaminated formation oil density.

6. The method of claim 5 wherein determining the uncontaminated formation oil density utilizes a pressure gradient that is based on formation pressure measurements at multiple depths.

7. The method of claim 1 further comprising determining a filtrate density, and wherein estimating the actual contamination of the formation fluid is further based on the determined filtrate density.

8. The method of claim 7 wherein determining the filtrate density is based on at least one downhole measurement.

9. The method of claim 1 further comprising:
determining an uncontaminated formation oil density;
determining a filtrate density; and
estimating initial contamination based on the obtained real-time density measurements, the determined uncontaminated formation oil density, and the determined filtrate density;
wherein estimating the actual contamination of the formation fluid is further based on the estimated initial contamination.

10. The method of claim 9 further comprising:
obtaining a wavelength-dependent optical density of filtrate;
iteratively obtaining instantaneous first estimates of wavelength-dependent optical density of uncontaminated formation oil based on:
the obtained real-time optical density data;
the obtained wavelength-dependent optical density of the filtrate; and
the estimated initial contamination; and
obtaining a second estimate of the wavelength-dependent optical density of uncontaminated formation oil based on accumulated ones of the iteratively obtained instantaneous first estimates of the wavelength-dependent optical density of uncontaminated formation oil;
wherein estimating actual contamination of the formation fluid is further based on the obtained real-time optical density measurements, the wavelength-dependent optical density of the filtrate, and at least one of:
the iteratively obtained instantaneous first estimates of wavelength-dependent optical density of uncontaminated formation oil; and
the second estimate of the wavelength-dependent optical density of uncontaminated formation oil.

11. The method of claim 1 further comprising preprocessing the real-time optical density measurements to remove effects of optical scattering from the real-time optical density measurements, and wherein estimating the actual contamination of the formation fluid is based on the preprocessed real-time optical density measurements.

12. The method of claim 1 further comprising adjusting an operational parameter of the downhole sampling tool based on the estimated actual contamination of the formation fluid, wherein adjusting an operational parameter of the downhole sampling tool comprises at least one of:
initiating storage of a sample of the formation fluid within the downhole sampling tool; and
adjusting a rate of pumping of formation fluid into the downhole sampling tool.

13. The method of claim 1 further comprising determining first and second coefficients collectively relating density and optical density of the formation fluid, and wherein wavelength-dependent optical density of the formation fluid is equal to the sum of the first coefficient and the product of the second coefficient and density of the formation fluid.

14. The method of claim 13 wherein determining the first and second coefficients comprises fitting the obtained real-time density and optical density measurements with the relationship between the wavelength-dependent optical density of the formation fluid, the density of the formation fluid and the first and second coefficients.

15. The method of claim 14 further comprising:
obtaining uncontaminated formation oil density; and
obtaining wavelength-dependent optical density of uncontaminated formation oil based on the obtained uncontaminated formation oil density.

16. The method of claim 15 wherein:

one of filtrate density and wavelength-dependent optical density of the filtrate is known and the other one is unknown;

the method further comprises determining a value of the unknown one based on the known one; and estimating actual contamination of the formation fluid is based on:

the value determined for the unknown one;

the obtained wavelength-dependent optical density of uncontaminated formation oil; and the obtained real-time optical density measurements.

17. An apparatus, comprising:

a downhole sampling tool conveyable within a wellbore extending into a subterranean formation, wherein the downhole sampling tool comprises:

a flowline conducting formation fluid obtained from the subterranean formation via operation of the downhole sampling tool;

a plurality of co-located sensors proximate the flowline and including a densimeter and an optical density sensor such that density measurements and optical density measurements are obtained substantially simultaneously;

a multi-channel spectrometer comprising the optical density sensor; and a controller operable to estimate an actual contamination of the formation fluid flowing through the flowline based on a relation between real-time density and optical density measurements obtained via the plurality of co-located sensors.

18. The apparatus of claim 17 wherein the downhole sampling tool is conveyable within the wellbore via wireline or drill string.

19. The apparatus of claim 17 wherein the densimeter comprises a vibrating sensor that oscillates in perpendicular modes within the formation fluid conducted in the flowline.

20. The apparatus of claim 17 wherein the controller is further operable to adjust an operational parameter of the downhole sampling tool based on the estimated actual contamination of the formation fluid, and wherein adjusting the operational parameter of the downhole sampling tool comprises at least one of:

directing obtained formation fluid into a storage chamber of the downhole sampling tool; and adjusting an operating parameter of a pump of the downhole sampling tool based on the estimated actual contamination of the formation fluid, wherein the pump is operable to pump formation fluid from the subterranean formation through the flowline.

* * * * *